United States Patent [19]

Masak

[11] 4,280,128

[45] Jul. 21, 1981

[54] ADAPTIVE STEERABLE NULL ANTENNA PROCESSOR

[75] Inventor: Raymond J. Masak, East Northport, N.Y.

[73] Assignee: The United States of America as represented by the Secretary of the Army, Washington, D.C.

[21] Appl. No.: 132,941

[22] Filed: Mar. 24, 1980

[51] Int. Cl.³ .............................................. G01S 3/06
[52] U.S. Cl. .............................. 343/100 LE; 343/854
[58] Field of Search ........... 343/100 LE, 854, 100 SA

[56] References Cited

U.S. PATENT DOCUMENTS

4,225,870  9/1980  Marner et al. ........................ 343/854

Primary Examiner—Eli Lieberman
Attorney, Agent, or Firm—Nathan Edelberg; Sheldon Kanars; Jeremiah G. Murray

[57] ABSTRACT

An adaptive signal processing system for enhancing the signal-to-interference characteristics on both receive and transmit using an in phase-quadrature correlator to control phase and amplitude adjust circuits located in the antenna signal paths. The amplitude adjustment provides amplitude balance control with variable delay lines between a quadrature hybrid and a sum-difference hybrid. The analog outputs of the correlator are digitized to control incrementally adjustable delay lines of the phase and amplitude circuits in binary steps.

9 Claims, 17 Drawing Figures

FIG. 12 ABC POWER RATIO

FIG. 13

FIG. 14 SEVEN BIT PHASE SHIFTER

FIG. 15 COMPLEMENTARY OFFSET

ADAPTIVE STEERABLE NULL ANTENNA PROCESSOR

The invention described herein may be manufactured, used, and licensed by or for the Government for governmental purposes without the payment of any royalties thereon.

BACKGROUND OF THE INVENTION

1. Field of the Invention

This invention relates to radio receiving and transmitting systems which adaptively suppress interference by controlling the null directivity of the pattern of an antenna array.

2. Description of the Prior Art

Adaptive array antenna systems are currently the subject of intense interest and investigation/development for radar and communications applications. The principal reason for the interest is their ability to automatically steer nulls onto undesired sources of interference, thereby reducing output noise and enhancing the detection of desired signals. These systems usually consist of an array of antenna elements and a real-time adaptive receiver-processor which has feedback control over the element weights.

Communications and radar antenna systems using either conventional narrow band or spread spectrum modulation formats are susceptible to degradation in SNR performance caused by undesired "noise" which intrudes via the antenna sidelobes and mainlobes. The noise may consist of deliberate electronic countermeasures (ECM) friendly RF interference (RFI), clutter scatterer returns, and natural noise sources. This degradation is often further aggrevated by motion of the antenna, poor sitting conditions, multipath, and a changing interference environment. Adaptive array techniques offer possible solutions to these serious interference problems via their flexible capabilities for automatic null steering and notching in the spatial domain, the frequency domain, and in polarization. Adaptive nulling is considered to be the principal benefit of adaptive techniques at the present time.

A tutorial paper on "Adaptive Arrays--An Introduction" by William F. Gabriel appears in the *Proceedings of the IEEE* Vol. 64, No. 2, February 1976, pages 239-272. United States patents of interest includes: U.S. Pat. No. 3,713,167—David—Class 343/797 U.S. Pat. No. 3,932,818—Masak—Class 328/167 U.S. Pat. No. 3,981,014—Masak—Class 343/100LF U.S. Pat. No. 4,024,541—Albanese et al.—Class 343/17.1R U.S. Pat. No. 4,064,422—Masak—Class 364/841 U.S. Pat. No. 4,097,866—Frost et al.—Class 343/100LE U.S. Pat. No. 4,075,633—Lewis—Class 343/100LF U.S. Pat. No. 4,015,977—Fitting et al.—Class 325/472

It is also possible that an unfriendly source of deliberate interference may possess the capability for monitoring the transmissions from the transceiver. It is therefore desirable not only to protect the receiver from the interference, but to also prevent information from the transmitter from being intercepted.

The least mean square (LMS) algorithm has been firmly established for adaptive antenna systems. A hardlimiter modification has been introduced into the basic control loop to improve the circuit characteristics, in particular the system dynamic range is doubled.

SUMMARY OF THE INVENTION

An object of the invention is to provide a steerable null antenna processor, in which the null developed during reception is also maintained during transmission.

According to the invention, a receive-transmit steerable null antenna processor includes incrementally adjustable delay lines and an amplitude balance control network (variable ratio power) for adjusting the relative phase and amplitude of two or more antenna branches to steer a null on an interference source. Least-mean-squares loop control including In phase-Quadrature correlation provides feedback control signals which are converted to digital form to adjust the delay lines for phase and amplitude balance.

CROSS REFERENCE TO RELATED APPLICATION

Part of the matter disclosed herein is covered by a copending application, Ser. No. 132,940, filed Mar. 24, 1980, by R. J. Masak and H. F. Baurle, for Steerable Null Antenna Processor with Gain Control. That application is incorporated by reference.

DETAILED DESCRIPTION

Figure 1:
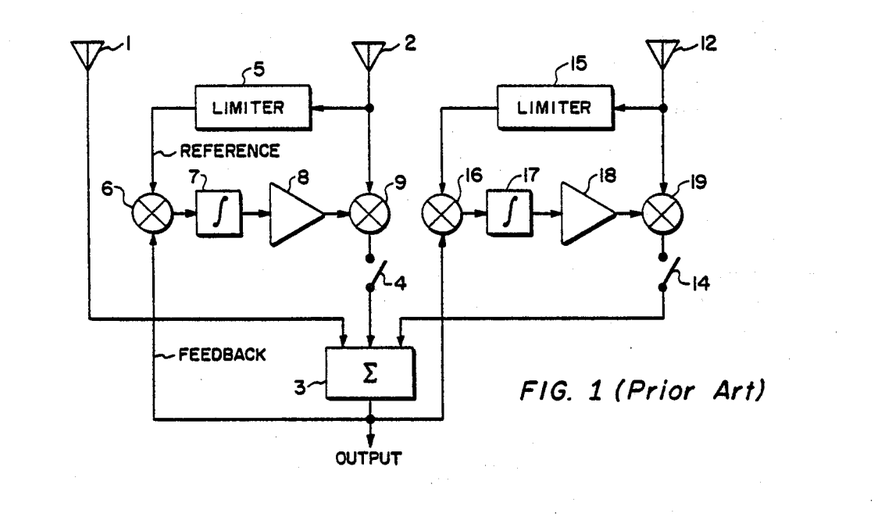
FIG. 1 is a diagram of a basic prior art steerable null antenna processing system.

A basic prior art adaptive steerable null antenna system is illustrated in FIG. 1. Consider first a system comprising two antenna elements, which may be a main element 1 and an auxiliary element 2. The output signal from the main antenna element 1 is fed to a summer or combiner unit 3. An adaptive loop associated with the auxiliary antenna element 2 may be connected to the summer 3 via a switch 4. The loop is comprised of a limiter 5, a multiplier 6, an integrator 7, an amplifier 8, and a multiplier 9. When one interfering signal is present, the loop adjusts the phase and amplitude of the interfering signal from antenna element 2 to cancel the interfering signal in the main channel. Another antenna element 12 may be connected to the system by closing switch 14. This element has an adaptive loop comprising limiter 15, multiplier 16, integrator 17, amplifier 18 and multiplier 19. This loop permits a second interfering signal to be cancelled. In general, to cancel N intefering signals requires at least N+1 antenna elements and at least N adaptive loops. In some systems the main antenna element is directive and the auxiliary elements are omnidirectional. Actual systems often include local oscillators to change the processing frequencies at various points, band pass filters, and other components.

Figure 2:
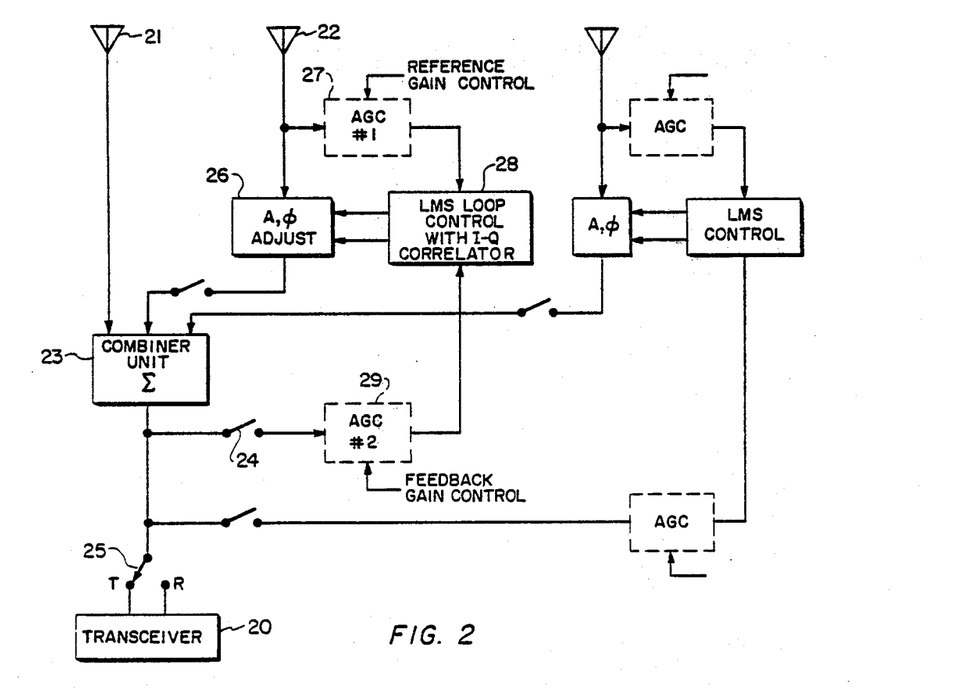
FIGS. 2 and 3 are block diagrams of receive-transmit steerable null antenna processor systems.
Figure 3:
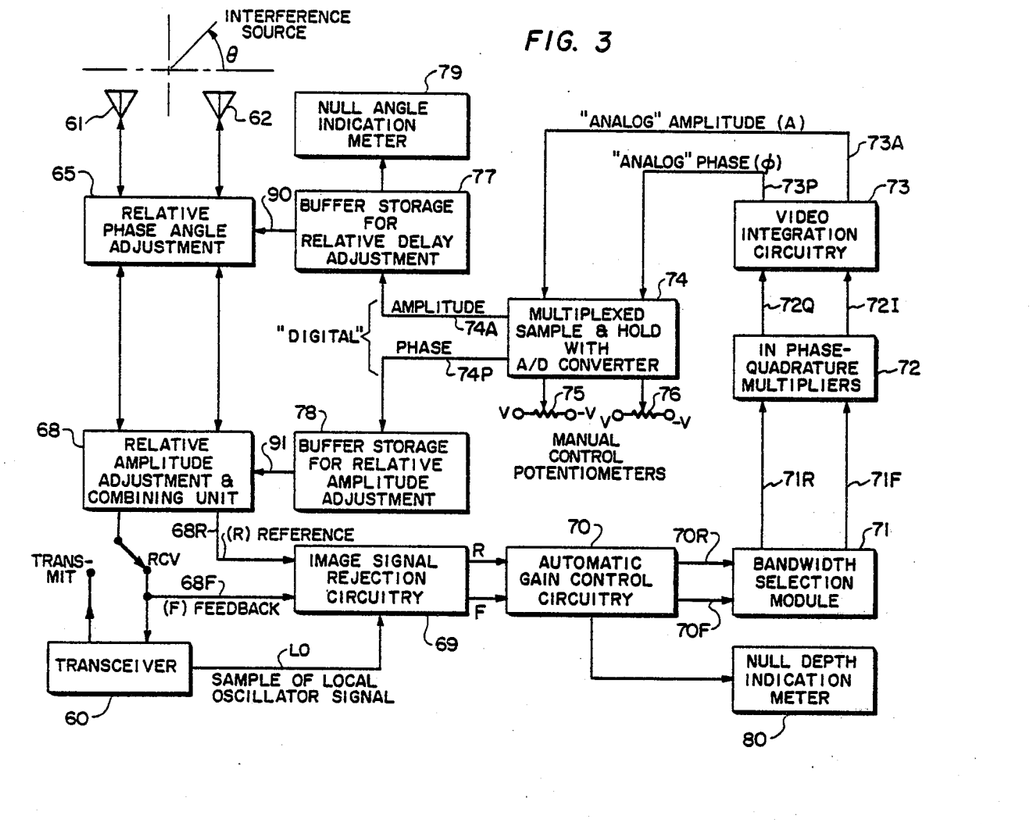

FIGS. 2 and 3 illustrate two approaches for a receive-transmit steerable null antenna processor which may incorporate the features of this and the related patent application. They both include high power phase shifters and amplitude adjust circuits in the path between the antenna array and the transceiver; and both use an LMS (least mean squares) closed loop processor which includes an I-Q (In phase-quadrature) correlator. In FIG. 2 the phase and amplitude adjust circuits are provided in the branch between an auxiliary antenna element, the reference signal comes from the auxiliary antenna element, and the feedback signal is from the summation of the main and auxiliary antenna branches. In FIG. 3 the phase and amplitude control circuits are in all antenna branches, although for one antenna they may be fixed in value. The reference and feedback signals are both taken from the combiner, which may be a sum-difference hybrid. A VHF system design for radio equipment operating in the 30-80 megahertz band interfaces with two conventional center-fed vertical antenna elements and the RF input and output of a transceiver. A UHF system (not shown) interfaces between four antenna elements and an appropriate transceiver. Both designs permit rapid manual and automatic nulling of received undesired signals over a wide dynamic range. The two element system permits the nulling of one signal by 35 dB over a range of 360 degrees. The four element system permits a 35 dB nulling of two signals different in azimuth. Both systems also permit rf transmission at high power levels with any null pattern generated in the most recent receive mode. Deep null transmission in any of the selected aximuth is also possible through the use of alternate manual controls. Auxiliary circuitry such as a null depth meter and null azimuth readout are also available to the operator.

The system concept for each system design involves the integration of an adaptive control technique with incrementally variable phase and amplitude adjustment circuitry placed directly at the rf antenna outputs. The adaptive control mechanism senses the interference environment and adjusts the relative amplitudes of one or more rf modules attached to the antennas such that a minimization of interference occurs after a summation of the weighted antenna signals. This processed signal then becomes the input to the transceiver.

The communications transceiver is connected to the output. When the transceiver set transmits, a relay disconnects the receiver and connects the transmitter. The loop is opened and the existing settings of the phase shifter and amplitude control are held. Transmitted power passes through these same units with the result that a transmission null is formed at the same azimuth angle on both the transmission and the reception. When transmission ceases, the receiver is again connected and the loop is closed, continuously maintaining the null. A continuous-data and unmodified LMS control loop is basically a closed loop analog feedback system which uses correlation techniques to minimize output power level in accordance with an optimum mathematical criterion called the least-mean-square algorithm. Hardware implementations of the technique generally suffer from a lack of dynamic range in that excellent performance can be readily achieved only over a relatively small input dynamic range. The modifications to the basic LMS control loop generated during this program involve the use of suitably controlled automatic gain control circuits (AGC) which can extend interference cancellation capability over the required wide input dynamic range.

In the sampled-data VHF system of FIG. 3 the operation of correlation and AGC are performed with analog circuitry driven by two outputs from the ABC network. The only signal required from the transceiver itself is a sample of the local oscillator which is used to optimize performance in the band near the desired communications channel. The two analog video signals coming from the correlator are sampled and quantized in a multiplexed A/C converter which alternately updates the values in the incrementally variable time delay phase shifter and ABC networks. Phase data is quantized to seven bits and relative amplitude data to six bits. The portion of the system generating the multiplexed digital control signals when driven by the ABC outputs can be considered a basic building block of higher order systems such as the four element UHF design.

The time delay phase shifter used in both the VHF and UHF systems is composed of switched lengths of transmission lines.

To summarize, a two-element VHF system configured with the LMS loop controller consists of three major blocks or component circuits, namely (1) delay line phase shifters,
(2) amplitude balance control, and
(3) the LMS loop controller.

The phase shifter compensates for the difference in the time of arrival of the interfering wave form at the two antennas. The amplitude balance control (ABC) adjusts the amplitude in the two channels.

Figure 4:
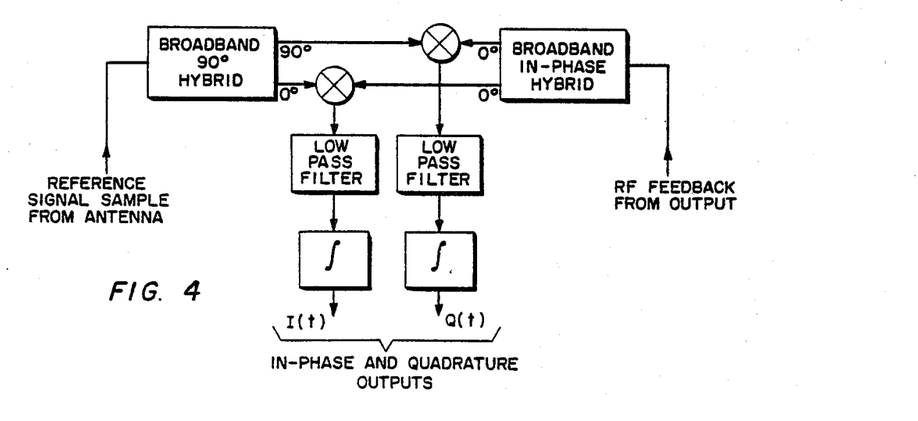
FIG. 4 is a block diagram of a broadband In phase-Quadrature correlator for the system of FIGS. 2, 3, or 4.

Another system configuration including the above components is shown in FIG. 4. With phase and amplitude properly adjusted, the interference is cancelled out.

The purpose of the correlator is to compare the output from the combiner with the input at the antenna. The correlator causes the phase shifter and amplitude control to go to the settings which result in cancellation of the interference. When more than one signal is present, the correlator adjusts the phase and amplitude to null the component of the output having the highest correlation with the input. If the interference is the strongest signal present at the correlator, the null is formed on the interference.

The I/Q correlator provides two output signals, one in the form of in-phase (I) and the other in the form of quadrature components (Q). These two signals must be converted to phase ($\phi$) and amplitude (A) to control the phase shifters and the ABC respectively. Together, these key components comprise a feedback system which continuously corrects the phase and amplitude of the interfering signal to maintain a null during reception.

Since the I/Q correlator is the most important component of the LMS control loop, a few words should be mentioned about its operation. The high level, unprocessed RF from one antenna is multiplied by the residue signal existing in the processor beyond the nulling point.

Since the undesired signal is assumed to be stronger than the desired signal, the loop gain is higher for the undesired, and the system tends to form a null on the undesired signal. The greater the ratio of desired to undesired signal, the greater the suppression of the undesired signal. In some cases, the signal levels arriving at the antenna from desired and interfering sources may be approximately the same. In this event, a manual control of the null steering function is provided; the operator adjusts the amplitude and phase control to achieve the desired improvement in S/I ratio. FIG. 4 contains a block diagram of the wideband I/Q correlator, which may be used in either of FIGS. 2 or 3.

Figure 5:
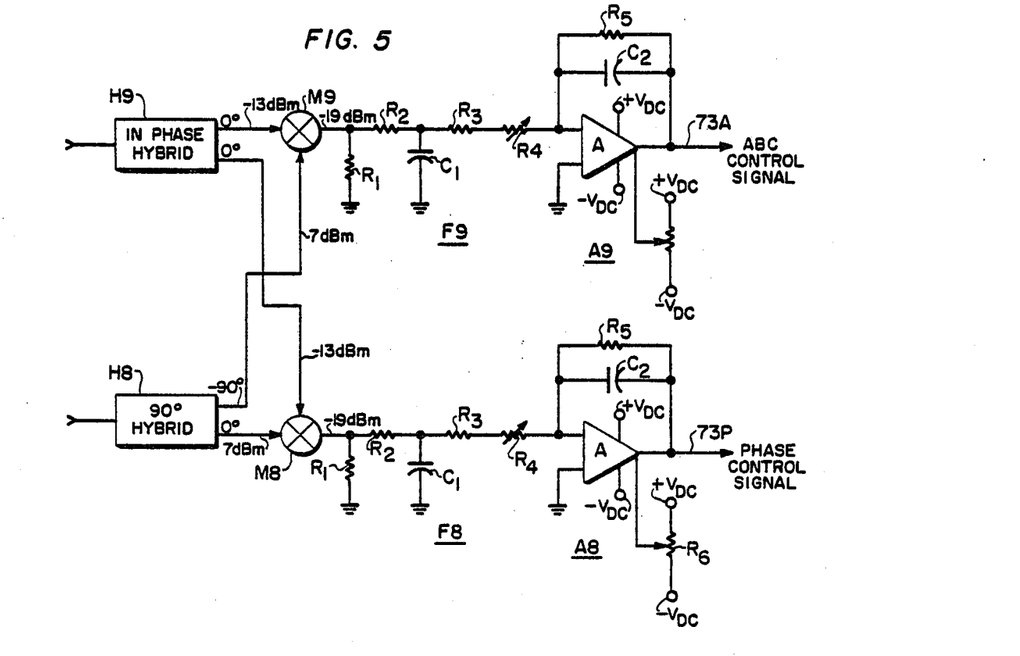
FIG. 5 is a diagram of an in phase/quadrature correlator for the system of FIGS. 3 and 7.

The most important signal representations are included in FIG. 5, including the reference input and the RF feedback residue signal from the input of the receiver. Miniature quadrature and in-phase hybrids are available in the required frequency bands of interest. Using these two hybrids and two broadband mixers, the video in-phase and quadrature outputs are available after some nominal low-pass filtration. These in-phase and quadrature loop control signals are then smoothed in the loop integrator generating the actual control loop signals used to perform the required processing. The output of the correlator is in the form of I/Q components. These components may be digitized as shown in FIG. 3, in order to control the phase and amplitude adjust circuits.

In FIG. 2 a third antenna element and a second loop are shown to illustrate how loops may be added to provide null steering for more than one interfering source, similar to the prior art as shown in FIG. 1. More than two loops may be used. There are also other arrangements known for processing and combining signals from three or more antenna elements and two or more loops.

FOUR-ELEMENT ARRAYS USING THE LMS CONTROL LOOP

Figure 6:
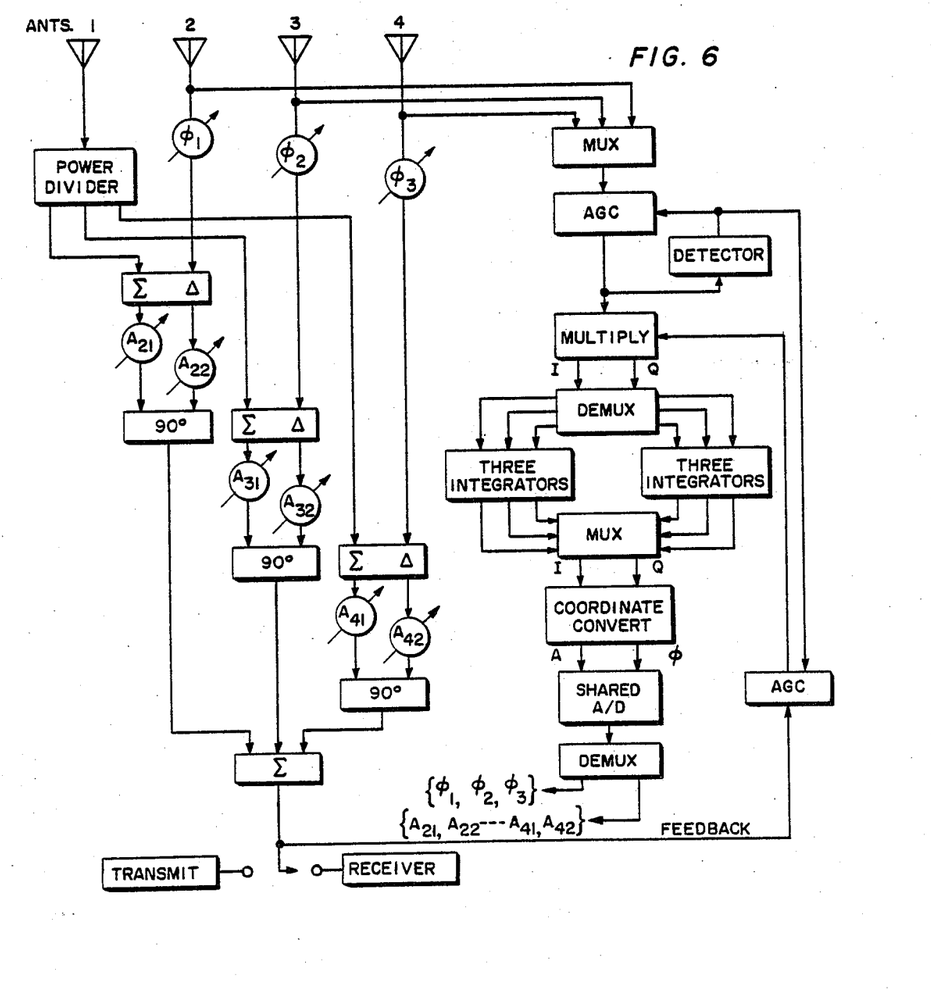
FIG. 6 is a block diagram of a four-antenna-element receive-transmit steerable null antenna processor system with hybrid serial-parallel control loop.

All the previous analysis on the LMS control loop is directly applicable to the four-element case. However, the number of nulls is not only proportional to the number or array elements minus one, but is also proportional to the number of loops. If in the four-element case the system is required only to null two undesired signals, then only two loops are required. However, if the system must null three undesired signals, then three loops are required. In order to circumvent the dependence of nulling the number of undesired signals to the number of loops, time sharing the loop with each antenna was proposed. FIG. 6 shows a simplified block diagram of such an approach.

IMPLEMENTATION OF A 30–80 MHz SYSTEM

This section contains a description of a 30–80 MHz two antenna implementation beginning with a functional system description. The system operates as a closed loop sampled-data feedback control system which minimizes unwanted interference signals at the rf input of transceiver sets. The system also has the capability of transmitting on the most recent null pattern since the controlled elements in the system can also withstand the high power levels of the transmit mode.

FIG. 3 contains a functional block diagram of the 30–80 MHz system. For this implementation the system interfaces with two conventional center-fed antennas 61 and 62 such as the AS-1729/VRC and a matching communications transceiver 60, such as an AN/VRC-12. In the receive mode of operation, internal control signals are generated which adjust the relative amplitudes and phases of the signals from the two antennas such that a minimization of received interference occurs after the weighted signals are combined.

The output of the amplitude adjustment and combining unit 68 generates a reference signal at lead 68R and a feedback error signal at lead 68F. The feedback signal also forms the input to the receiver. The reference and feedback signals are eventually correlated to generate the actual control signals used to make the amplitude and phase adjustments. Three additional processing functions are first performed on both the reference and feedback signals prior to correlation.

The first of these processing functions is the use of image signal rejection circuitry 69. The purpose of this module is to restrict off-line control loop operation to the sub-band of interest and to prevent any image sub-bands or image frequencies within a selected sub-band to be present in the control loop circuitry. The in-line rf control components actually used to perform the amplitude and phase adjustments cover the complete 30–80 MHz band. The image signal rejection circuitry requires a sample of the local oscillator signal in order to perform the required mixing operations for each sub-band of interest. The mixing operations are arranged such that the output center frequency of the image rejection module is a constant independent of the sub-band or channel of reception. The use of this circuitry in combination with the broadband rf control components permits operation anywhere within the 30–80 MHz band with maximum interference protection centered on the selected information channel.

The second processing operation in the sequence is the use of automatic gain control (AGC) circuitry 70. This IF circuitry operates on the reference and feedback signal outputs from the image rejection module. Use of the AGC circuitry extends the dynamic range in a manner such that a fixed amount of cancellation or contrast ratio can be achieved over a wide input dynamic range of interference. Signals in the AGC module are also used as inputs to a null depth indication meter 80.

The last processing function occurring before actual correlation uses a bandwidth selection module 71 to optimize control loop operation. This module contains two pairs of bandpass filters. Each pair is composed of one filter nominally matched to the bandwidth of the matching network usually associated with the antennas, and other nominally matched to the narrower channel bandwidth. When the first filter is used in both reference and feedback paths, operation is optimized to suppress interference within the band of the antenna matching network. When the second is used, operation is optimized to suppress in-channel interference.

The reference 71R and feedback 71F outputs of the bandwidth selection module are then correlated to generate the actual amplitude and phase control signals. Both the reference and feedback signals are coherent and on the same IF carrier frequency. The correlation of these two signals is accomplished in a two step procedure. In the first step, the reference signal is split into in-phase and quadrature components while the feedback signal is split into two in-phase components. Cross multiplications of appropriate pairs of these four signals generate two bipolar video signal outputs from the module 72 labeled "in phase-quadrature multipliers" in FIG. 3. The correlation process is completed by integrating these two video signals as shown in the figure. The required system control signals for amplitude (A) and phase ($\phi$) are generated directly at the output of the video integration module. No polar coordinate conversion is required.

Both required system control signals are in an analog format at this point in the system. The required digital control signals used to drive the relative phase and amplitude adjustment circuits are generated by quantizing (analog to digital conversion) the two outputs of the video integration module. In order to minimize hardware complexity multiplexing and buffer storage techniques are used.

Manual phase and amplitude control are available by switching the input of the A/D converter to appropriate potentiometers. The null angle indication meter 79 can be driven directly by the information contained in the buffer storage module associated with the relative delay adjustment signal.

Figure 7A:
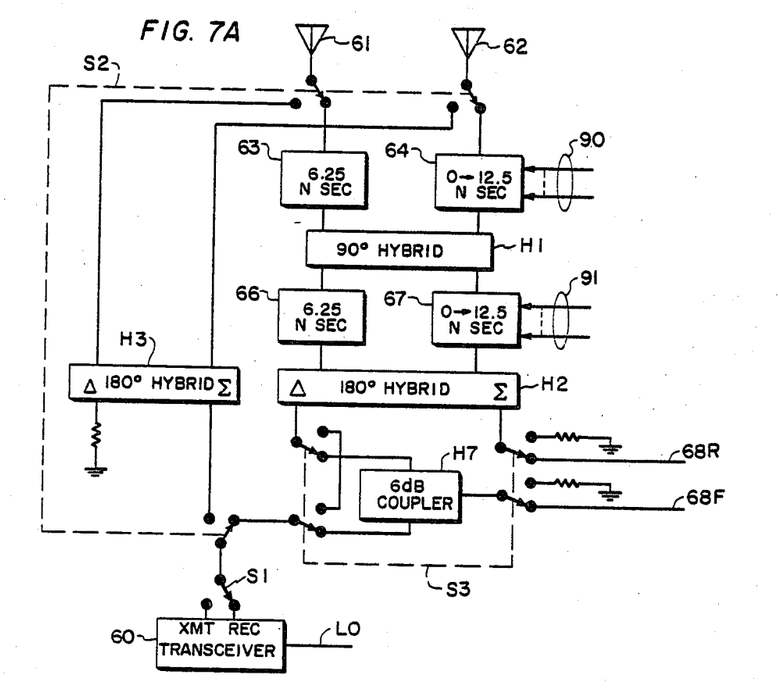
FIG. 7 comprising 7A, 7B and 7C is a more detailed functional block diagram of the system of FIG. 3.
Figure 7B:
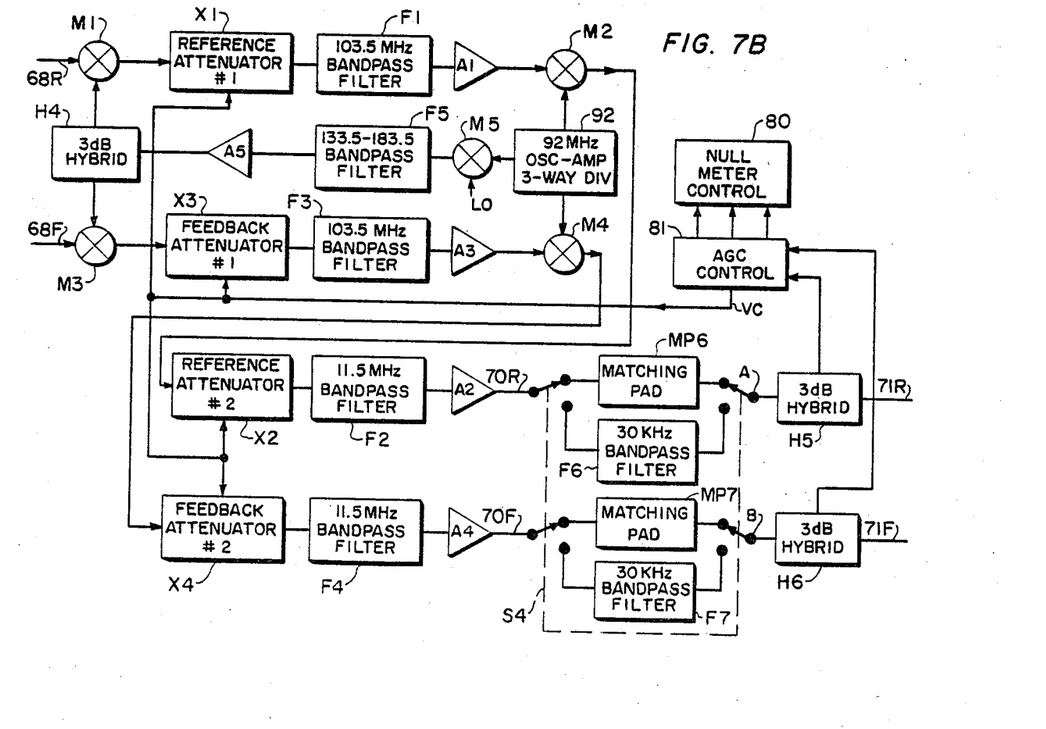
Figure 7C:
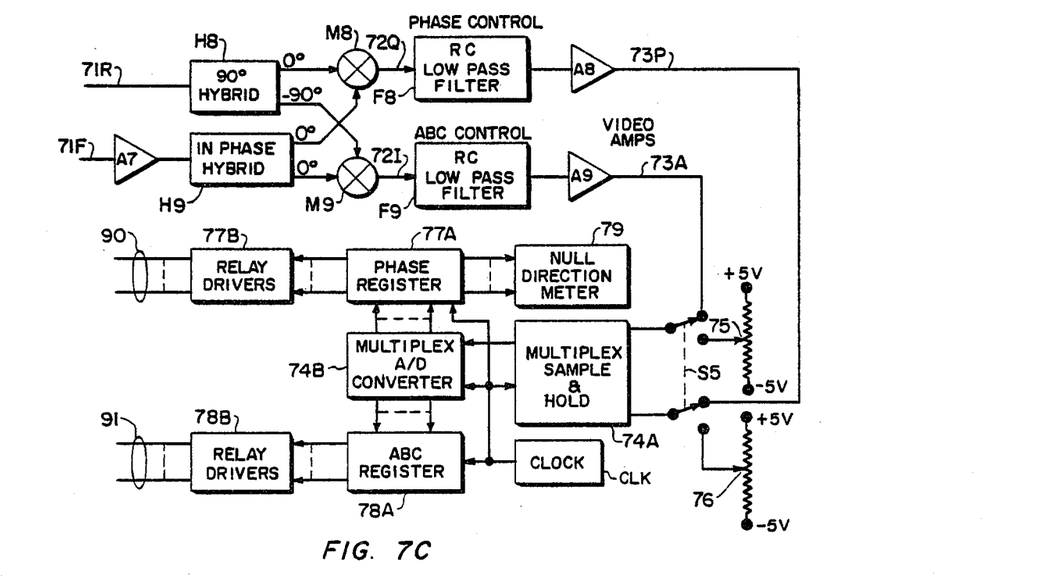

A further expansion of the functional block diagram of FIG. 3 is shown in FIG. 7 comprising parts 7A, 7B and 7C.

The system possesses several operational modes along with several auxiliary circuit features. The modes are selected to take maximum advantage of the capabilities of the processor while simultaneously minimizing the effects when not required. The modes are selected by several double throw switches (or relays) shown in FIG. 7 as S1–S5. Switch S1 (FIG. 7A) is transmit-receive control. A three-pole switch S2 disconnect the null steering circuits and connects a sum-difference hybrid H3. A four-pole switch S3 in the position shown places a 6 dB coupler H7 between the difference output of the combining hybrid H2 and the transceiver, with an output to lead 68F, and connects the sum output of hybrid H2 to lead 68R, while the other position of the switch by-passes coupler H7 and connects terminating resistors in place of leads 68R and 68F. A four-pole switch S4 (FIG. 7B) is for bandwidth selection. A two-pole switch S5 (FIG. 7C) selects manual or automatic control of the null steering.

CONTROL SYSTEM SIGNAL FLOW

This subsection describes the signal flow in the major elements of the control system. These elements include the rf amplitude and phase control modules, image rejection and AGC circuits, bandwidth selection module, correlator, and digital multiplexing units. The discussion is keyed to the block diagram of FIG. 7.

RF AMPLITUDE AND PHASE CONTROL

It is assumed that the system is in a wideband receiving mode. An undesired signal within the 30 to 80 MHz band enters antenna 61 and is channeled via switch S2 through a 6.25 nanosecond delay line 63 offset. A zero to 12.5 nanosecond variable delay line 64 is placed in a corresponding position after switch S2 in order to adjust the relative delay of the signal coming from antenna 62.

The output of the delay offset module 63 drives the 90 degree hybrid H1 of the amplitude balance control circuit. The required phase shift control of the ABC network is achieved through the use of one fixed time delay network 66 and one variable time delay network 67, similar in design to the modules used to adjust the relative time delays between antennas 61 and 62. Here again, the fixed delay module 66 in the ABC network is set at 6.25 nanoseconds. Both the "phase" and "amplitude" variable delay networks are initially set at their mid-range values of 6.25 nanoseconds. By choosing the mid-range values of delay and selecting the difference port output of the 180 degree hybrid H2 in the ABC network, the system is biased to operate about a natural broadside null. In some embodiments, the ABC configurations used the same types of 90 degree and 180 degree hybrids with their system positions interchanged with respect to the positions used in FIG. 7A. Both configurations would work; the relative location selected does, however, possess a natural broadside null as opposed to the natural end-fire null of the other configurations.

The sum ($\Sigma$) port output of the ABC network forms the reference signal input on lead 68R to the control circuits; while a 6 dB down sampled signal from the difference ($\Delta$) port output forms the feedback signal on lead 68F. The direct output of the coupler H7 is channeled to the transceiver input.

IMAGE REJECTION AND AGC CIRCUITS

The circuit realizations of the functional operations of image signal rejection and automatic gain control for both reference and feedback path signals begin at leads 68R and 68F. The signal flow for both the reference and feedback signals are essentially identical; therefore, only the reference path will be considered in detail.

The switchable phase shift networks and hybrids used to perform the relative phase and amplitude adjustments are linear at the maximum signal levels expected both on receive and during transmit. Therefore, handling the high end of the required dynamic range presents no problems for these networks.

The processor control functions are activated only during the receive modes of operation.

Mixer M1 translates the frequency of any rf interference signal in the 30–80 MHz band to a 50 MHz band centered at 103.5 MHz. A bandpass filter F1 centered at 103.5 MHz truncates this 50 MHz band to 10 MHz.

The local oscillator signal (L) for mixer M1 is generated in the following manner. Samples of the transceiver local oscillator are mixed with a system 92 MHz oscillator. Mixer M5 performs the required operation. The R port mixer input of mixer M5 ranges in frequency between 41.5 and 91.5 MHz. This local oscillator frequency range is typically used in 30–80 MHz transceivers so that a constant difference frequency output of 11.5 MHz occurs no matter which channel is selected. The I port output of mixer M5 goes between 133.5 and 183.5 MHz and is selected through use of a bandpass filter F5 centered at 158.5 MHz with a 1 dB bandwidth of 50 MHz. Filtering on the order of four or five poles is adequate. A mixer driver amplifier A5 covering the band provides L port drive to mixers M1 and M3 after a 3 dB power division.

Wide dynamic range subminiature flatpack double balanced mixers are available for use as mixers M1 and M3. Models such as the ANZAC MD-139 are suitable. Since the output frequency of mixer M1 is slaved to the selected channel of the transceiver by use of mixer M5, the selected channel will always appear at an output center frequency of 103.5 MHz. The bandpass filter used at this center frequency has a bandwidth of 10 MHz, adequate to permit wideband operation but narrow enough to provide additional out-of-band signal rejection. A four or five pole filter design is adequate.

In the reference path processing this bandpass filter F1 is placed between reference attenuator X1 and reference amplifier A1. These other two modules perform one-half of the AGC function for the reference channel signal. The other half is performed down line at another center frequency.

The reference channel gain control function is partially accomplished by controlling the value of reference attenuator X1. Flatpack voltage controlled attenuators covering 1.5 MHz to 1 GHz are presently available. Models such as the ANZAC AT-101 can provide about 60 dB of attenuation control range with a minimum attenuation or static loss of about 3 dB. The AGC control voltage VC acts in a manner to increase the loss in reference attenuator X1 when the maximum output of mixer M1 occurs.

The three required local oscillator signals are available from unit 92 as the outputs of a three way power divider which is driven by a narrowband amplifier and the 92 MHz offset oscillator. The required gain of the 92 MHz amplifier can be supplied by either an Avantek GPD-403 or an ANZAC AM-101 "unit amplifier."

The image signal rejection function is completed by taking the 11.5 MHz (103.5−92=11.5) difference frequency output from mixer M2. The second half of the AGC function is completed by processing the I port output of Mixer M2 in reference attenuator X2 and reference amplifier A2. The bandpass filter F2 used at the output of attenuator X2 is used to establish the band of operation. This filter has approximately four to five poles and a bandwidth of 5 MHz centered at 11.5 MHz.

The AGC action and image frequency rejection is accomplished in an almost identical manner for the feedback path of FIG. 7B, except for the following change. The gain of feedback amplifier A3 is increased by 6 dB to about 56 dB to make up for the losses associated with the 6 dB coupler. The gain of feedback amplifier A4 is the same as reference amplifier A2. Feedback attenuators X3 and X4 are designed the same way as reference attenuators X1 and X2 respectively.

RESIDUE AMPLIFIER

A residue amplifier A7 (FIG. 7C) of 20 dB gain is placed between point B and the input to the in-phase hybrid H9 of the correlator. The amplifier is selected so that it is in saturation by about 14 dB at the beginning of the adaptation process; that is, when its input is a maximum of 10 dBm, (after the 3 dB loss of the hybrid used to drive the AGC circuits). In steady state the input signal to the amplifier drops to −30 dBm generating a residue amplifier output of −10 dBm. This level is chosen to insure linear operation of the multipliers or phase detectors used in the correlator. In the correlation process the terms "multipliers" and "phase detectors" are used interchangeably.

IN PHASE/QUADRATURE CORRELATOR

The in-phase quadrature correlator (FIG. 7C) is composed of a 90 degree hybrid H8, an in-phase hybrid H9, a pair of phase detectors or mixers M8 and M9, a pair of low-pass filters F8 and F9, and a pair of video amplifiers A8 and A9.

The output from the upper mixer in the correlator of FIG. 7C is the ABC control signal after suitable integration while the lower mixer output is the phase control signal after similar integration. Conventional RC filter techniques are used to achieve integration time constants of 10 seconds. Gains are chosen in the two video amplifiers after the low-pass filters to ensure a ±5 V bipolar drive signal capability to the subsequent digital control circuits. The required video gain is on the order of 300 V/V.

DIGITAL MULTIPLEXING TECHNIQUE

The two analog video output signals from the correlator are multiplexed in a single sample and hold circuit 74A which uses two SPST switches under the control of a master clock. An A/D converter alternately outputs quantized ABC and phase signals into appropriate phase and ABC registers 77A and 78A. Data in the phase register is also used to estimate null direction. The register outputs control two sets of relay drivers 77B and 78B. The outputs of the first set control the 0 to 12.5 nanosecond phase shifter 64 while the outputs of the second set control the 0 to 12.5 nanosecond phase shifter 67 in the ABC network.

CORRELATOR INTEGRATION NETWORK

Figure 9:
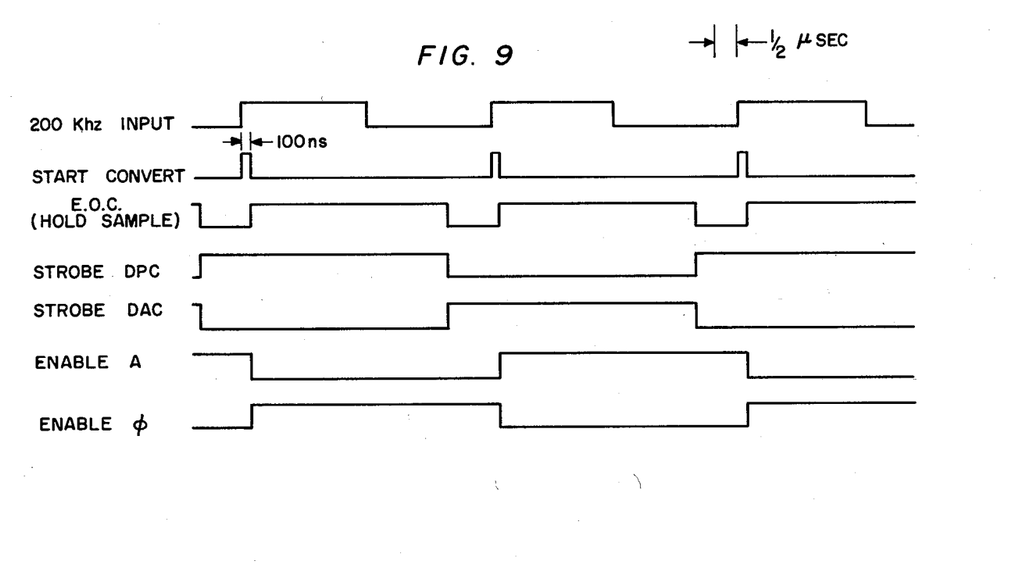
FIG. 9 comprises timing waveforms for the multiplexer, sample and hold, A/D converter, and buffer storage of FIG. 8.

The correlator integration network shown in FIG. 7C is shown in more detail in FIG. 9.

Two single pole RC filters are used in each of the identical video paths of FIG. 9. The filter implemented with the $R_2C_1$ combination is used to minimize any high frequency inputs to operational amplifier A. The cutoff frequency of this filter is about 2500 radians per second. Actual control loop filtering is dominated by the $R_5C_2$ filter in the feedback path of the operational amplifier. Values of $R_5$ and $C_2$ are selected to insure a rise time of about 10 seconds. Variations of potentiometer $R_4$ only affects the dc gain of the operational amplifier.

Use of an operational amplifier such as the Burr Brown 3921/14 can provide about 300 volts/volt gain with an output noise level of ±600 v and a voltage drift of ±30 v/degrees C.

DIGITAL CONTROL CIRCUITS

This circuitry shown in block diagram form in FIG. 7C provides the necessary components to measure, A/D convert, and store two analog input voltages associated with amplitude (A) and with phase (0) respectively. Each voltage is sampled at a 100 KHz rate and held as a 7-bit binary number (6 bits+sign) for 10 μs. Utilization of multiplexing techniques result in the elimination of one sample-and-hold module and one A/D converter at little additional circuitry complexity. The logic line utilized throughout is standard 7400 series TTL. This line has the necessary speed specifications and is also compatible with the interfacing requirements.

Figure 8:
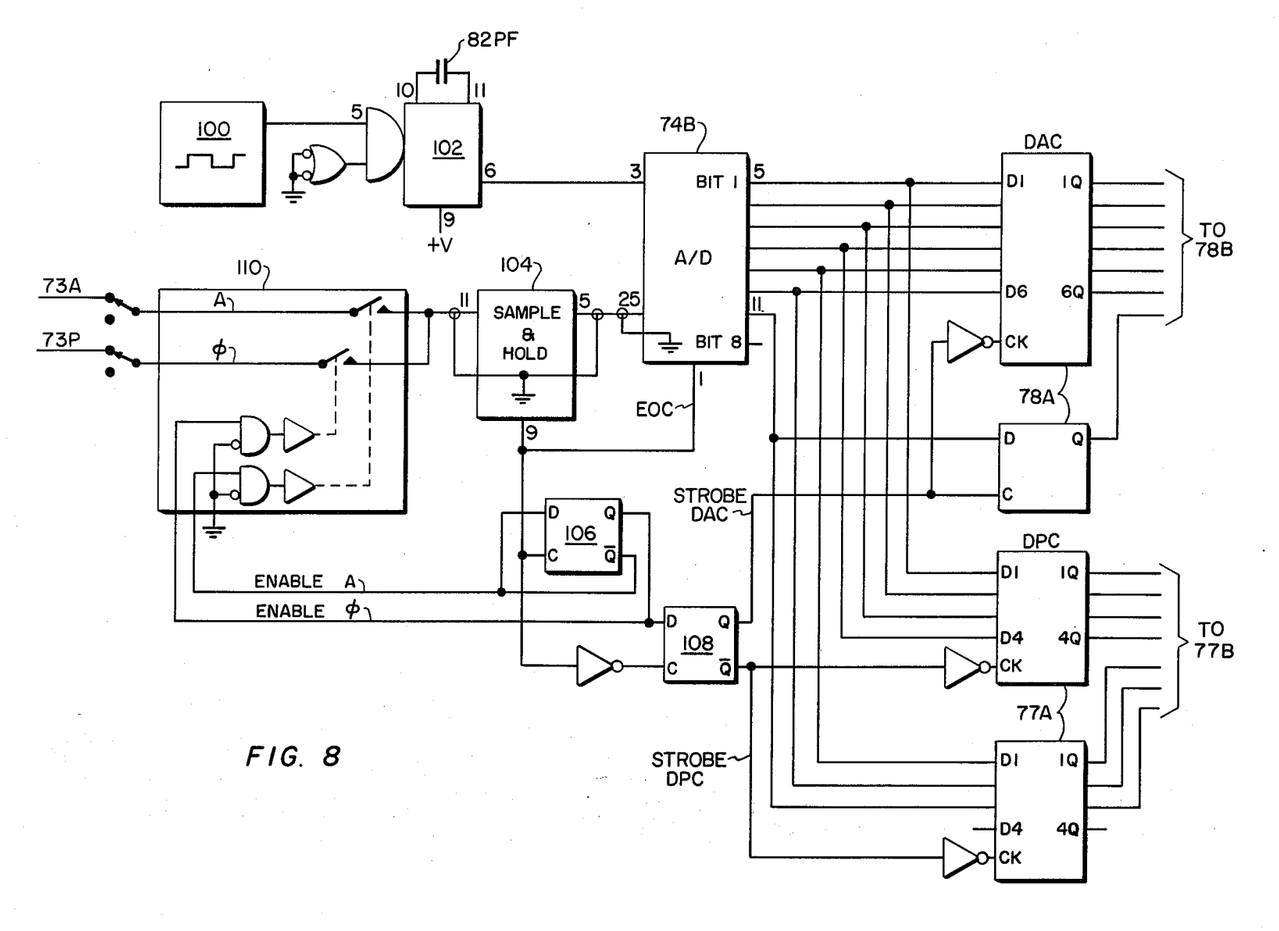
FIG. 8 is a functional block diagram of the digital interface circuitry of FIG. 7C.

A detailed logic schematic of the digital circuitry is given in FIG. 8. Associated timing waveforms are given in FIG. 9. The NE555V Timer 100 is wired as an oscillator specifically to generate a 200 KHz TTL level square wave. This 200 KHz waveform is then fed to the positive Schmitt-trigger logic input of the SN74121 Monostable Multivibrator 102 whose Q output 6 (START CONVERT) is a 100 ns wide positive-going pulse occurring at a 200 KHz rate (refer to timing waveforms in FIG. 9 which are applicable to entire description).

This 100 ns pulse, which is routed to the START CONVERT input 3 of the 8-bit A/D Converter 74B (ADC-EHI), starts the converter causing its E.O.C. output to go to a logic "1". E.O.C. (End-of-Conversion) is a signal generated internally in the A/D converter. It is a logic "1" during the conversion process which takes approximately 4 μs. It goes to a logic "0" when the process is complete and the 8-bit digital number is available at the output. E.O.C. is fed to both the sample-and-hold module 104 (SHM-2) and to the Switch Control Flip Flop (SN7474) and results in the following:

a. The value of the analog input voltage at terminal 11 to the S and H circuit which was present when E.O.C. went positive (logic "1") is held constant at the analog output terminal 5 for as long as E.O.C. remains positive (the hold decay rate of 50 v/sec is insignificant for the 4 μsec conversion time). The maximum value of the voltage is ±5 volts.

b. The Switch Control Flip-Flop 106 is toggled; i.e., if its Q output (ENABLE O) was previously a logic "1" it will now switch to a logic "0" and vice-versa. The Q and Q outputs ENABLE O and ENABLE A respectively) are used to control the dual single-pole-single throw electronic analog switch 110 as follows: When ENABLE A=logic "1" the switch associated with the A input is closed. Similarly, when ENABLE O equals logic "1", the electronic switch associated with the 0 input is closed. The inputs are thus alternately sampled which achieves the desired multiplexing.

At the end of the conversion process, E.O.C. goes negative. This signal is inverted and fed to the Clock Terminal of the Strobe Flip Flop 108 (SN7474) whose outputs, STROBE DAC and STROBE DPC respectively, transfer the A/D output to the desired buffer storage unit; i.e., if the information available at the A/D output pertains to the A input, the Strobe Flip Flop will be steered in such a manner (ENABLE O=logic "1") that the signal STROBE DAC will go positive at this time. This results in the 7-bit binary number associated with the A input being strobed into seven flip-flops of the DAC buffer storage unit 78A (SN74174 and ½ SN7474) since the data present at the D inputs of this module will be transferred to the Q outputs when the CLK goes positive. In a similar manner the 7-bit A/D converter output associated with the O input will be transferred to seven flip-flops of the DPC Buffer Storage Unit 77A (SN74175) output when the waveform STROBE DPC goes positive. Thus, each Buffer Storage Unit will retain the measured value of A or O for 10 μs until the next available reading at which time it will be updated. Note that although the DAC or DPC output is changing at a 100 KHz rate, they do not change simultaneously, but rather in quadrature fashion with one another. When it is desired to hold the data in the phase and amplitude registers, the clock input to the registers can be shorted out. With the clock shorted (through an appropriate resistor) the present values cannot be updated and are effectively memorized. Only the necessary number of bits are retained from the 8 bit A/D converter.

AMPLITUDE BALANCE CONTROL (ABC) THEORY

A key element of the system is the ABC implementation. On transmission, the ABC proportions the power between the two antennas with a minimum of power loss.

The presence of mutual coupling between antennas and multipath causes an amplitude unbalance requirement of as much as 10 dB in either direction for nulling at all azimuths. If the proper amplitude relationship is established by utilizing attenuation in one antenna signal path, a loss in sensitivity occurs on receive and transmit. An amplitude balance control (ABC) implementation in principle can achieve any desired amplitude ratio between signals at two antenna elements with no more attenuation than the low insertion loss of the devices used.

Figure 10:
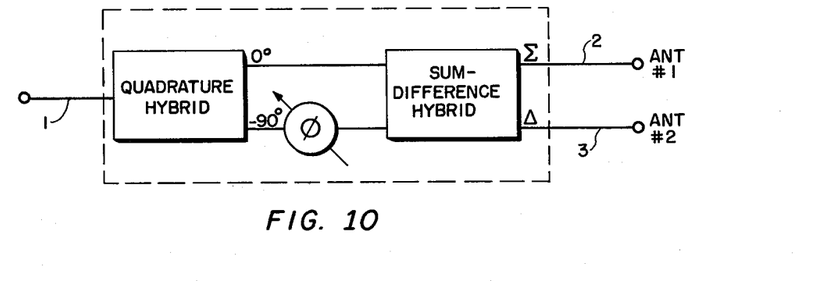
FIG. 10 is a functional block diagram for explaining amplitude balance control.
Figure 11:
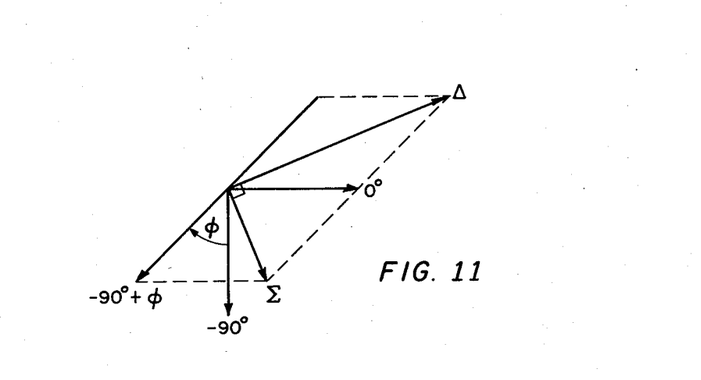
FIG. 11 is a phaser diagram of amplitude balance control.

FIG. 10 is a block diagram of one form in which an ABC can be configured. There are other forms; however, the basic principle of operation is the same. A signal at point 1 is split by the quadrature hybrid into two equal amplitude signals which are 90 degrees apart in phase, 0 degree and −90 degree signals, respectively. The phasor diagram in FIG. 11 is helpful to visualize the relationships. The −90 degree signal is phase shifted before entering one port of the sum-difference hybrid. The sum-difference hybrid combines the two signals to form a sum signal at output point 2 and a difference signal at output point 3. The phasor diagram in FIG. 11 shows pictorially that the sum and difference signals are generally of unequal amplitude and 90 degrees apart in phase. Geometrically, the sum and difference signals are the two diagonals of an equilateral parallelogram which by symmetry conditions are always perpendicular. The phase difference between the signals is a constant 90 degrees regardless of the phase introduced by the phase shifter in selecting the required amplitude unbalance. That is the amplitude control signal does not introduce phase shift as a function of the amplitude balance selected. In some form of attenuators considerable cross-coupling exists which causes the null position to shift as a function of the attenuation setting.

Figure 12:
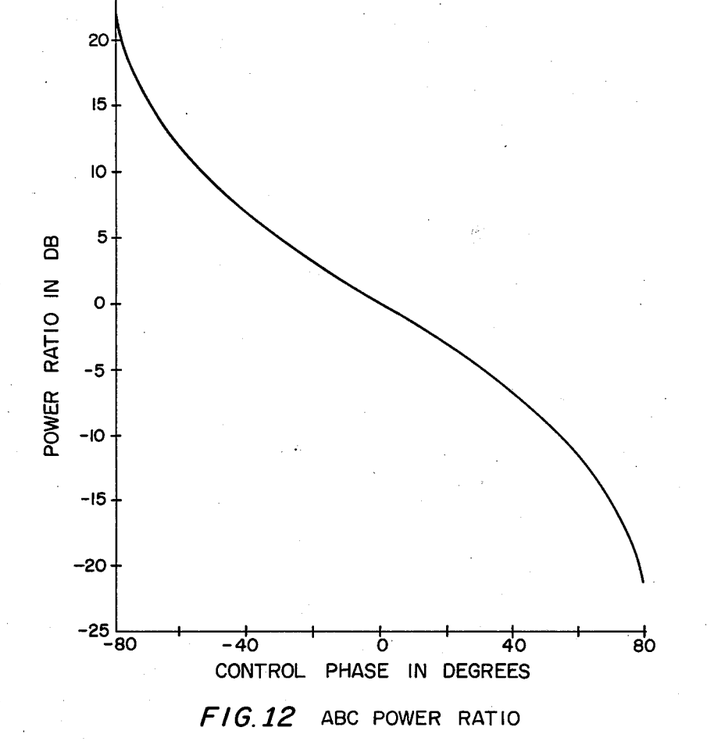
FIG. 12 is a graph showing ABC power ratio.

FIG. 12 is a plot of power ratio between the sum and difference signals in decibels as a function of the control phase in degrees. The curves show that the amplitude balance is changed from 10 dB in one direction to 10 dB in the other direction by changing the phase control from −55 degrees to +55 degrees.

Figure 13:
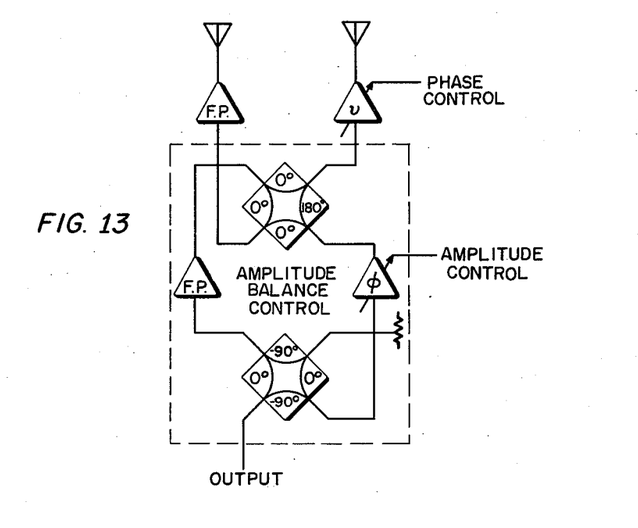
FIG. 13 is another showing of the amplitude balance control for explaining the receive operation.

FIG. 13 is the combiner diagram which is used in the description of reception signal phasors. The ABC is the same as the ABC shown in FIG. 10 except for the representation of the hybrids which have been denoted in a form which shows signal phase relationships. The fixed phase shifters shown in FIG. 13 are not essential to the analysis, and hence, they are assumed as zero phase shift.

The component of the output phasor from the right antenna signal phasor is rotated by changes in the setting of the phase control without disturbing the phase of the component from the left antenna signal phasor. Changes in the ABC control phase shift affect both output phasor components. However, the relative phase between the output phasor components does not change as 0 is varied. Variation of 0 causes the two output phasors to change relative amplitudes, and both phasor angles change in synchronism such that the relative phase between them stays fixed.

Briefly summarizing, the discussion in the foregoing paragraph indicates that phase and amplitude balance are independent controls. Therefore, manual nulling is theoretically a two step operation. First, the phase control can be varied until the two output phasor components are 180 degrees out of phase. Then the ABC control is varied until the amplitudes are equal.

In FIG. 7A, the amplitude balance control comprises the quadrature hybrid H1, a fixed phase shifter 66, a variable phase shifter 67, and a sum-difference hybrid H2.

PHASE SHIFTER CIRCUITS

Figure 14:
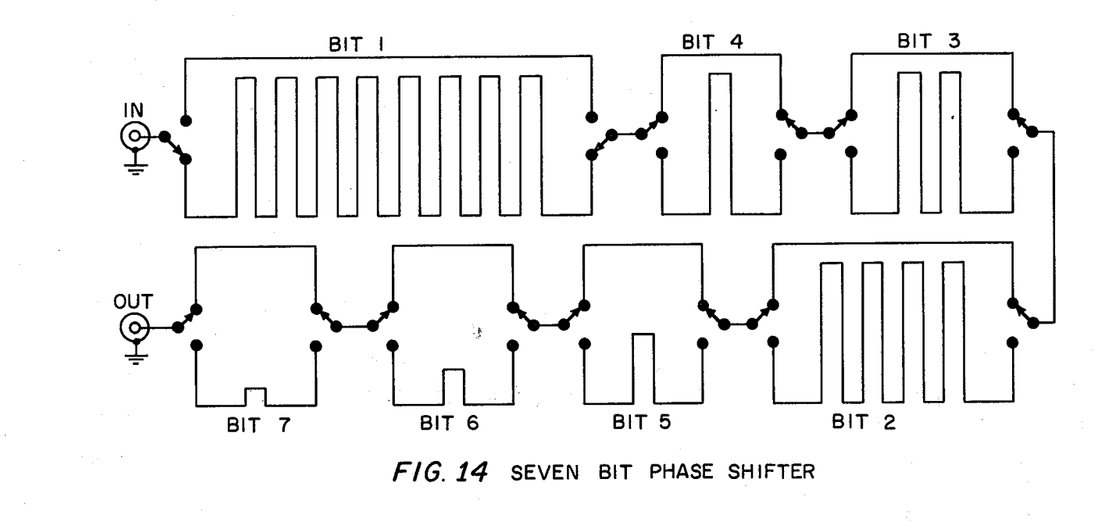
FIGS. 14 and 15 are schematic diagrams of an incrementally variable phase shifter and a fixed complementary offset respectively.
Figure 15:
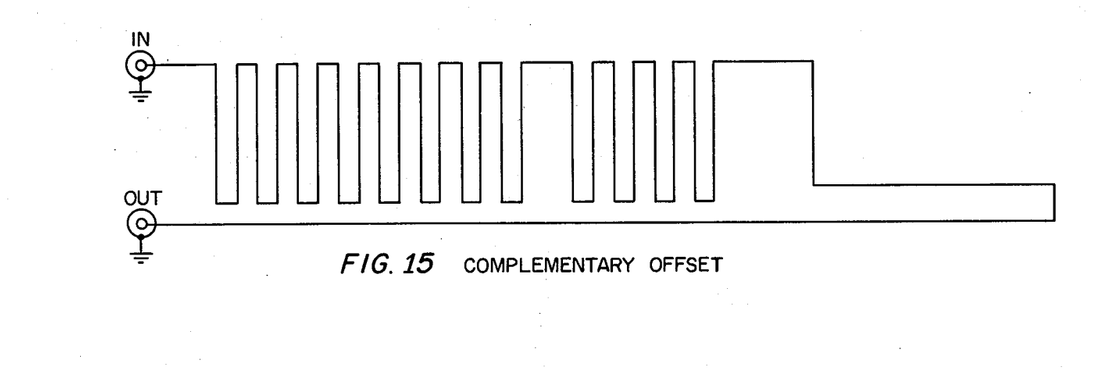

FIGS. 14 and 15 are schematic drawings of the phase shifter circuits used in both the phase and ABC control circuits. The schematics are sketched roughly in proportion to the manner laid out in an actual microstrip circuit. FIG. 14 describes the seven-bit phase shifter used as the "Controlled element" (variable from 0 to 12.5 nanoseconds) in either the phase shifter 64 or unit 67 of the ABC network (FIG. 7A). FIG. 15 describes the format of the complimentary 6.25 nanosecond offset delay of either the fixed phase shifter 64 or the unit 66 of the ABC network.

The fourteen SPDT switches used to control the seven-bit phase shifter are shown in FIG. 14. The switch states shown correspond to the inclusion of all bits except the first and most significant bit. This first bit corresponds to a differential delay 6.25 nanoseconds or 180 degrees at 80 megahertz. Each bit is composed of a reference and a delayed path, generally both characterized by differential delay values for each bit. It is the differential delay values of the bits that are related in a binary manner—e.g. bit 7 has the smallest differential delay, bit 6 has twice the differential delay of bit 7, etc.

The time delay designed into the complementary offset network of FIG. 15 is equal to the differential delay of the most significant bit (bit 1) and the sum total of the reference delays in all the bits.

Both offset and incrementally variable delay lines are fabricated on a copper clad (1 ounce both sides) silicone base dielectric (Custom High-707) substrate with a dielectric constant of 10. The SPDT switches can be operated by compatible drivers such as the SN5407.

CONCLUSION

This invention is for a digitally controlled adaptive loop suitable for use in a receive/transmit steerable null antenna processor. Prior art adaptive controlled antennas were primarily operable in the receive configuration and provided antenna null control in response to received signals by the use of analog processing, primarily at IF. In order to enable antenna null control for both received and transmitted signals a digital control loop is used. The received signals are applied to a coordinator converter which provides an output representative of the required phase and amplitude control which must be used in the signal combiner. These analog phase and amplitude control signals are periodically sampled and converted to digital numbers which are placed in buffer storage. The digital numbers held in the buffer controls used in the combining circuit for both transmit and received signals.

What is claimed is:

1. A steerable null antenna processor system for receiving desired wave energy signals from at least one angular region of space within the area covered by the system and for suppressing interfering signals from at least one other angular region comprising:
   antenna means having at least first and second antenna elements;
   antenna signal path means including combining means coupled between said antenna elements and a common port for supplying said desired wave energy signals to said common port;
   nulling means comprising phase means and amplitude means forming part of said antenna signal path means, both the phase means and the amplitude means being adjustable in incremental steps and having control inputs, operative in response to digital control inputs to adjust the phase and amplitude values of the nulling means;
   analog controller means having correlator means, at least one reference input and at least one feedback input from said antenna signal path means, said analog controller means being operative to generate analog phase and amplitude control signals, converter means to change the last said signals to digital control signals and to supply them to said control inputs of the nulling means, to thereby steer at least one null to interfering signals;
   said correlator means comprising an in phase hybrid and a quadrature hybrid with inputs coupled to said feedback and reference inputs, two mixers connected to multiply together outputs from said hybrids, and integration means to generate said analog phase and amplitude control signals.

2. A system according to claim 1, for both receiving and transmitting, wherein said antenna signal path means including the nulling means is reciprocal for received signals and transmitted signals to and from said common port respectively with substantially the same antenna radiation pattern, so that a null direction established for received signals may be maintained during transmission.

3. A system according to claim 1 or 2, wherein said analog controller means comprises a least means square loop.

4. A system according to claim 3, wherein said amplitude means comprises an amplitude balance control network including a quadrature hybrid, a sum-difference hybrid, and additional phase means which is adjustable in incremental steps and which is coupled between said hybrids, to provide a variable ratio of signal power amplitude at said antenna elements with respect to the combined power at said common port.

5. A steerable null antenna processor system for receiving wave energy signals from at least one angular region of space within the area covered by the system and for suppressing interfering signals from at least one other angular region, using antenna elements; said processor system comprising:
   nulling means coupled between said antenna elements and a common port for supplying said desired wave energy signals to said common port, said nulling means being comprised of phase means and amplitude means, the amplitude means being a variable ratio combiner comprising a quadrature hybrid, a sum-difference hybrid, and two delay lines at least one of which is adjustable in incremental steps, each hybrid having a first, a second, a third and a fourth port, with one of said delay lines connected from the third port of a first of said hybrids to the first port of a second of said hybrids, and the other said delay line connected from the fourth port of the first hybrid to the second port of the second hybrid, said common port being the fourth port of the second hybrid; wherein said phase means comprises two delay lines at least one of which is incrementally adjustable, one connected from the first antenna element to the first port of said first hybrid, and the other connected from the second antenna element to the second port of the first hybrid;
   memory means to store digital signals for setting said delay lines to selected steps, comprising phase memory means connected to control inputs of the delay lines of said phase means, and amplitude memory means connected to control inputs of the delay lines of said amplitude means;

analog controller means with a least means square loop comprising a reference path, a feedback path, and correlation means; the reference path and feedback paths having respective input connections from said third and fourth ports of the second hybrid; the correlation means comprising in phase/quadrature means connected to the feedback and reference paths to derive in phase and quadrature components and means to multiply them together, the correlation means further comprising integration means coupled to the in phase-quadrature means and having an analog amplitude output and an analog phase output on which analog control signals are produced, analog-to-digital means comprising sample-and-hold means and analog-to-digital converter means coupled between said outputs of said integration means and said memory means;

said analog controller means being operative in response to analog signals input to the feedback path and reference path to supply digital signals to said memory means to steer a null to interfering signals.

6. A system according to claim 5, for both receiving and transmitting, wherein said nulling means is reciprocal for received signals and transmitted signals to and from said common port respectively with substantially the same antenna radiation pattern, so that a null direction established for received signals may be maintained during transmission.

7. A system according to claim 5 or 6, wherein said in phase/quadrature means comprises an in phase hybrid coupled to the feedback path, a quadrature hybrid coupled to the reference path, and two mixers, each having two inputs, one from each of the last said hybrids; and said integration means comprises two resistance-capacitance low pass filters, each followed by video amplifier means coupled respectively to said analog amplitude output and said analog phase output.

8. A system according to claim 7, wherein said analog-to digital means includes time division multiplex means arranged to time share the sample-and-hold means and the analog-to-digital converter means for alternating use for amplitude control signal and phase control signal conversion.

9. A system according to claim 8, wherein in said nulling means said first hybrid is the quadrature hybrid and said second hybrid is the sum-difference hybrid, said common port being the difference port of the second hybrid and said reference path being coupled to the sum port.

* * * * *